(12) United States Patent
Fisher et al.

(10) Patent No.: US 6,252,321 B1
(45) Date of Patent: Jun. 26, 2001

(54) ENDSHIELD ASSEMBLY WITH ALIGNABLE BEARING FOR AN ELECTRIC MOTOR

(75) Inventors: L. Edwin Fisher; Marc D. Pape, both of Fort Wayne, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/338,365

(22) Filed: Jun. 23, 1999

(51) Int. Cl.[7] .................................................. H02K 5/00
(52) U.S. Cl. ................................. 310/89; 310/90; 310/91
(58) Field of Search ................................. 310/89, 90, 91, 310/51, 42, 43, 44

(56) References Cited

U.S. PATENT DOCUMENTS

| | | | | |
|---|---|---|---|---|
| 3,875,436 | * | 4/1975 | Macfarland | 310/43 |
| 4,420,703 | * | 12/1983 | Adam et al. | 310/154 |
| 4,823,032 | * | 4/1989 | Ward et al. | 310/43 |
| 5,127,148 | * | 7/1992 | Lykes et al. | 29/596 |
| 5,917,258 | * | 6/1999 | Kershaw et al. | 310/51 |
| 5,945,759 | * | 8/1999 | Tanaka et al. | 310/90 |
| 5,969,447 | * | 10/1999 | Periyathamby et al. | 310/89 |
| 6,040,649 | * | 3/2000 | Horng | 310/91 |

* cited by examiner

Primary Examiner—Nestor Ramirez
Assistant Examiner—Thanh Lam
(74) Attorney, Agent, or Firm—Carl Horton, Esq.; Damian Wasserbauer, Esq.; Armstrong Teasdale LLP

(57) ABSTRACT

An endshield assembly for an electric motor is described. The endshield assembly includes a metal endshield, a bearing assembly, and an injected molded metal center housing that couples the bearing assembly to the metal endshield. The bearing assembly includes a cylindrical housing having an outer surface. The center housing includes a cylindrical wall having an inside surface and a plurality of projections extending from the inside surface of the cylindrical wall. The projections are positioned around the circumference of the inside surface of the center housing to engage the outer surface of the bearing housing. The projections are staggered about the center housing circumference so that every projection contacts the outer surface of the bearing housing on an opposite side of a bearing housing circumferential centerline than an immediately adjacent projection.

14 Claims, 2 Drawing Sheets

ENDSHIELD ASSEMBLY WITH ALIGNABLE BEARING FOR AN ELECTRIC MOTOR

BACKGROUND OF THE INVENTION

This invention relates generally to electric motors and more particularly, to an endshield assembly for an electric motor.

Known electric motors typically include a motor housing, a stator, and a rotor assembly The rotor assembly includes a rotor core and a rotor shaft extending through the core. The housing includes a shell and two endshields and houses at least a portion of the rotor assembly. Electric motors also include at least one bearing sized to receive the rotor shaft. Typically the bearings are coupled to the endshields with springs, brackets or other mountings. The endshields attach to ends of the housing shell. For optimum operation of the motor, the bearings need to align with the rotor shaft, i.e., the center of the bearing cartridge opening needs to align with the centerline of the rotor shaft.

Each part of the endshield and bearing assembly is manufactured to a tolerance, and the tolerance of the assembly is the sum of the tolerances of the parts. Known cartridge bearing and endshield mounting configurations result in additive tolerances. Additive tolerances of the parts of the assembly can result in misaligned bearings and associated wear and motor performance problems.

It would be desirable to provide an endshield and bearing assembly that would not produce additive tolerances, therefore, resulting in lower tolerances in the final motor assembly. It would also be desirable to provide an endshield and bearing assembly that has a reduced number of parts and that provides accurate support of the bearing element and that permits limited bearing alignment.

BRIEF SUMMARY OF THE INVENTION

In an exemplary embodiment, an endshield assembly for an electric motor includes a metal endshield, a bearing assembly, and an injected molded metal center housing that couples the bearing assembly to the metal endshield. The bearing assembly is sized to receive a center shaft of the electric motor and includes a cylindrical housing having an outer surface.

The center housing includes a plurality of projections extending from the inside surface of a cylindrical wall. The projections are positioned around the circumference of the inside surface of the center housing to engage the outer surface of the bearing housing. The projections are staggered around the center housing circumference so that every projection contacts the outer surface of the bearing housing on an opposite side of a bearing housing circumferential centerline than an immediately adjacent projection.

The endshield assembly is fabricated by positioning the metal endshield in a mold/fixture. The bearing assembly is also positioned in the mold/fixture so that a centerline of the bearing assembly opening is aligned with a centerline of the center opening of the endshield. The center housing is then formed around the bearing assembly by the known process of injection molding. Molten metal is injected into the mold so that the metal forms an injected molded metal housing that contacts the metal endshield and the bearing assembly to couple the bearing assembly to the metal endshield.

The above described endshield assembly includes a reduced number of parts than known end shield and bearing assemblies. Because the endshield assembly uses a mold/fixture to align the metal endshield and the bearing assembly during the injection molding of the center housing, the are no additive tolerances. The tolerances of the bearing assembly and the endshield are absorbed by the injection molded metal center housing. The endshield assembly also provides accurate support of the bearing assembly and permits limited bearing alignment.

DETAILED DESCRIPTION OF THE INVENTION

Figure 1:
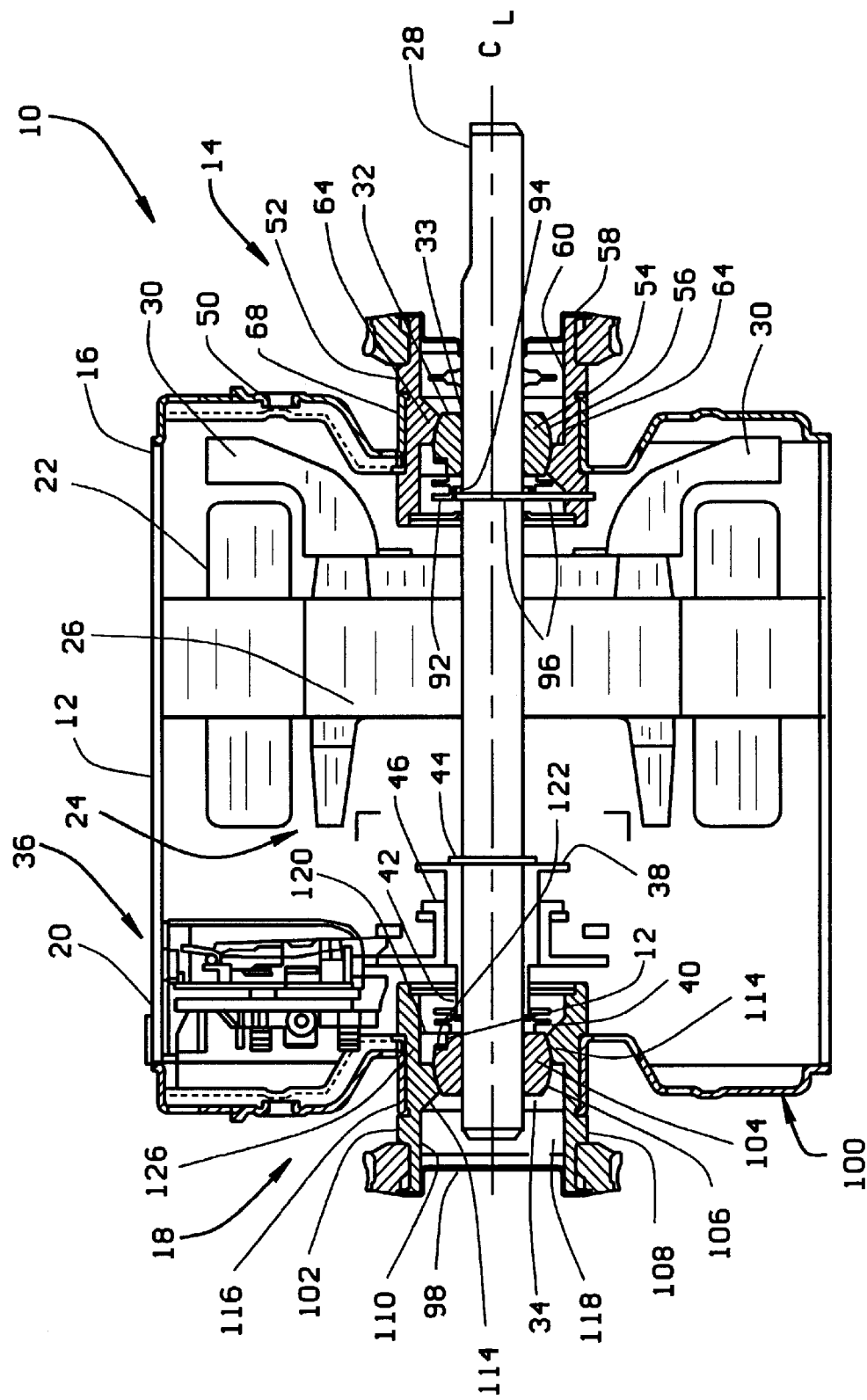
FIG. 1 is a sectional side view of an electric motor that includes an endshield assembly in accordance with an embodiment of the present invention.

FIG. 1 is a sectional side view of an electric motor assembly 10 in accordance with one embodiment of the present invention. Motor assembly 10 includes a cylindrical motor housing 12, a first endshield assembly 14 coupled to housing 12 at a first end 16, and a second endshield assembly 18 coupled to housing 12 at a second end 20.

Motor assembly 10 also includes a stator 22 and a rotor assembly 24. Rotor assembly 24 includes a rotor core 26 and a rotor shaft 28 extending through rotor core 26. Rotor assembly 24 also includes a plurality of fan blades 30 coupled to rotor core 26 to cool the windings of stator 22. Shaft 28 is rotatably supported by bearing assemblies 32 and 34.

Stator 22 includes run windings (not shown) and start windings (not shown). The start windings, in combination with the run windings, are used to initiate rotation of rotor core 26 and rotor shaft 28. Once shaft 28 has attained sufficient rpm to achieve a normal running speed, the start winding is "cut-out" of the motor circuit so that the start winding does not adversely impact motor operation. A centrifugal switch mechanism 36 is used to cut-out a start winding (not shown) when rotor shaft 28 reaches a pre-set rotational speed. Centrifugal switch mechanism includes a base collar 38 positioned on rotor shaft 28 adjacent bearing assembly 34. Particularly, a thrust runner 40 is positioned adjacent bearing assembly 34, and a spacer 42 is positioned between thrust runner 40 and base collar 38. A retaining ring 44 is positioned on rotor shaft 28 adjacent base collar 38. Retaining ring 44 is locked onto shaft 28 and maintains base collar 38 in contact with spacer 42 which in turn is maintained in contact with thrust runner 40 which in turn is maintained in contact with bearing assembly 34. Centrifugal switch mechanism 36 also includes a push collar 46 configured to slide axially on base collar 38. Push collar 46 engages switch arm 48. As rotor shaft 28 rotates push collar 46 moves axially along base collar 38 toward a flange 48 of collar 38 positioned adjacent retaining ring 44. The movement of push collar 46 causes switch arm 48 to move to the off position to cut-out the start winding (not shown).

Figure 2:
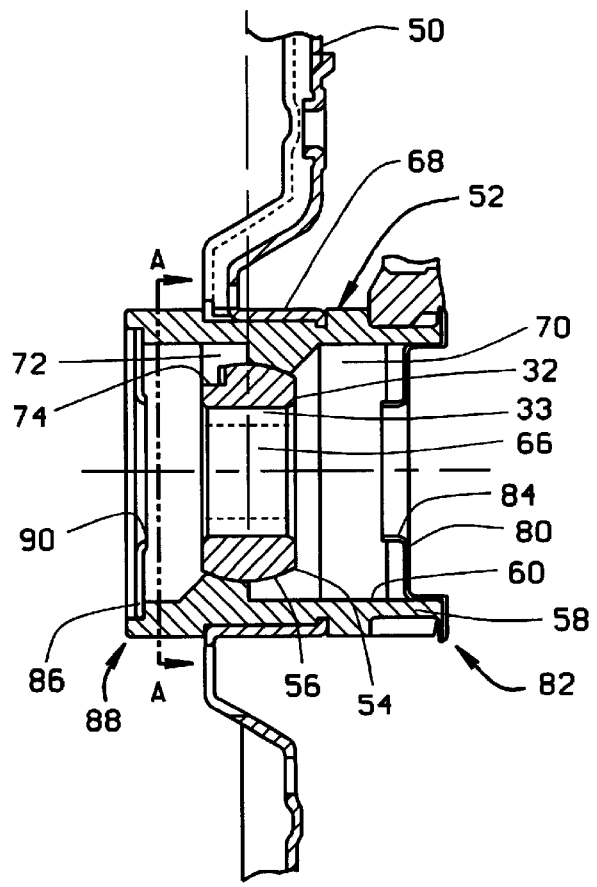
FIG. 2 is a sectional side view with parts cut away of an endshield assembly shown in FIG. 1.
Figure 3:
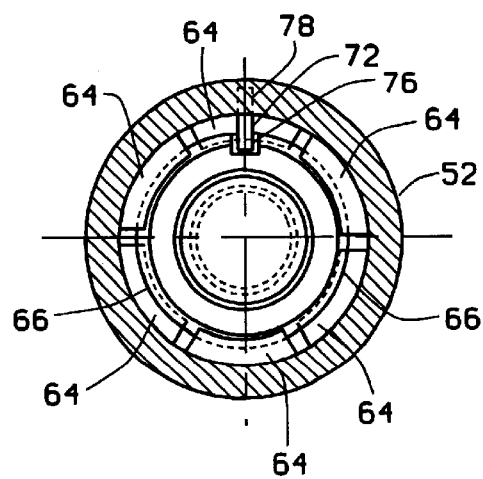
FIG. 3 is a cross sectional view through line A—A of the endshield shown in FIG. 2.

Referrring also to FIGS. 2 and 3, first endshield assembly 14 includes a metal endshield 50, bearing assembly 32, and an injected molded metal center housing 52 that couples bearing assembly 32 to metal endshield 50. Bearing assembly 32 includes a center opening 33 sized to receive center shaft 28 of motor 10 and includes a cylindrical housing 54 having an outer surface 56.

Center housing 52 includes a cylindrical wall 58 having an inside surface 60 and an outside surface 62, and a plurality of projections 64 extending from inside surface 60 of cylindrical wall 58. Projections 64 are positioned around the circumference of inside surface 60 of center housing 52 to engage outer surface 56 of bearing housing 54. Projections 64 are staggered about the center housing circumference so that every projection 64 contacts outer surface of bearing housing 54 on an opposite side of a bearing housing circumferential centerline 66 than an immediately adjacent projection 64. Each projection 64 contacts bearing housing 54 from centerline 66 to an edge of bearing housing 54. In one embodiment, center housing includes six projections 64 with the first three projections 64 positioned on one side of centerline 66, and the second three projections 64 positioned on an opposite side of centerline 66.

Metal endshield 50 includes a flange 68 defining a center opening 70. Center opening 70 is sized so that center housing 52 can extend through center opening 70. Flange 68 is coupled to center housing 52.

First endshield assembly 14 also includes an anti-rotation key 72. Key 72 is sized to fit in an anti-rotation keyway 74 formed in center housing 52 and bearing housing 54. Bearing housing 54 includes a first anti-rotation keyway portion 76, and center housing 52 includes a second anti-rotation keyway portion 78. First and second anti-rotation keyway portions 76 and 78 are configured to lign to form the anti-rotation keyway 74. Anti-rotation key 72 prevents bearing assembly 32 from rotating in center housing 52. Also, first endshield assembly 14 includes an endplate 80 coupled to center housing 52 to close a first end 82 of center housing 52. Endplate 80 includes an opening 84 sized to permit shaft 28 to extend through endplate 80. A washer 86 is coupled to a second end 88 of center housing 52 to close second end 88. An opening 90 in washer 86 is sized to permit shaft 28 to extend through second end 86 of center housing 52.

To hold rotor shaft 28 in proper position a thrust runner 92 is positioned adjacent bearing assembly 32 and a spacer 94 is positioned adjacent thrust runner 92. A retaining ring 96 is positioned on rotor shaft 28 adjacent spacer 94. Retaining ring 96 is locked onto shaft 28 and maintains spacer 94 in contact with thrust runner 92 which in turn is maintained in contact with bearing assembly 32.

Second endshield assembly 18 is similar to first endshield 14 except that second endshield assembly 18 includes an endplate 98 that does not include an opening. Second endshield assembly 18 includes a metal endshield 100, bearing assembly 34, and an injected molded metal center housing 102 that couples bearing assembly 34 to metal endshield 100. Bearing assembly 34 is sized to receive center shaft 28 of motor 10 and includes a cylindrical housing 104 having an outer surface 106.

Center housing 102 includes a cylindrical wall 108 having an inside surface 110 and an outside surface 112, and a plurality of projections 114 extending from inside surface 110 of cylindrical wall 108. Projections 114 are positioned around the circumference of inside surface 110 of center housing 102 to engage outer surface 106 of bearing housing 104.

Metal endshield 100 includes a flange 116 defining a center opening 118. Center opening 118 is sized so that center housing 102 can extend through center opening 118. Flange 116 is coupled to center housing 102.

Second endshield assembly 18 also includes an anti-rotation key 120. Key 120 is sized to fit in an anti-rotation keyway 122 formed in center housing 102 and bearing housing 104. Bearing housing 104 includes a first anti-rotation keyway portion 124, and center housing 102 includes a second anti-rotation keyway portion 126. First and second anti-rotation keyway portions 124 and 126 are configured to align to form the anti-rotation keyway 122.

First endshield assembly 14 is fabricated by positioning metal endshield 50 in a mold/fixture (not shown). Bearing assembly 32 is also positioned in the mold/fixture so that the centerline of bearing assembly opening 33 is aligned with the centerline of center opening 70 of metal endshield 50. Center housing 52 is then formed around bearing assembly 32 by the known process of injection molding. Molten metal is injected into the mold so that the metal forms an injected molded metal housing 52 that contacts metal endshield 50 and bearing assembly 32 to couple bearing assembly 32 to metal endshield 50.

Particularly, metal endshield flange 68 is encased in wall 58 of center housing 52. The plurality of projections 64 extending from interior surface 60 of center housing 52 contact outer surface 56 of bearing housing 54.

Bearing housing 54 is then separated from center housing projections 64. Bearing housing 54 remains held in place by center housing projections 64, but is permitted to rotate within center housing 52. By separating bearing assembly 32 from center housing 52, bearing assembly 32 has a limited range of movement between center housing projections 64 which permits for limited bearing alignment when endshield assembly 14 is installed on motor 10. Typically, bearing housing 54 is separated from center housing 52 by elevating the temperature of bearing assembly 32.

Anti-rotation key 72 is installed in endshield assembly 14 by rotating bearing housing 54 to align first keyway portion 76 located in bearing housing 54 with second keyway portion 78 located in center housing 52 to form anti-rotation keyway 74. Anti-rotation key 72 is then inserted into anti-rotation keyway 74. Second endshield assembly 18 is fabricated in an identical manner.

The above described endshield assembly 14 includes a reduced number of parts than known endshield and bearing assemblies. Because endshield assembly 14 uses a mold/fixture to align metal endshield 50 and bearing assembly 32 during the injection molding of center housing 52, the are no additive tolerances. The tolerances of bearing assembly 32 and metal endshield 50 are absorbed by injection molded metal center housing 52. Endshield assembly 14 also provides accurate support of bearing assembly 32 and permits limited bearing alignment.

While the invention has been described and illustrated in terms of various specific embodiments, those skilled in the art will recognize that the invention can be practiced with modification within the spirit and scope of the claims. For example, sleeve bearing constructions have been described above, however, ball bearing assemblies can also be used in the practice of this invention. Specifically, the inner ball bearing liner is inserted into the mold and the central housing is injection metal molded around the ball bearing liner as described above. This injection metal molded construction eliminates the need to cast a separate metal outer liner around the inner ball bearing liner and then machining the outer housing to obtain concentricity and size.

What is claimed is:

1. An endshield assembly for an electric motor, the electric motor including a center shaft, said endshield assembly comprising:

a metal endshield;

a bearing assembly sized to receive the electric motor center shaft; and an injected molded metal center housing that couples said bearing assembly to said metal endshield, said center housing comprising:

a cylindrical wall having an inside surface and an outside surface; and a plurality of projections extending from said inside surface, said projections positioned around a circumference of said inside surface to engage an outer surface of said bearing assembly, each said projection contacts said outer surface of said bearing housing on an opposite side of a beating housing circumferential centerline than an immediately adjacent projection.

2. An endshield assembly in accordance with claim 1 wherein said metal endshield comprises a stamped steel endshield.

3. An endshield assembly in accordance with claim 1 wherein said injected molded metal center housing comprises an injected molded zinc center housing.

4. An endshield assembly in accordance with claim 1 wherein said bearing assembly comprises a cylindrical housing having an outer surface.

5. An endshield assembly in accordance with claim 4 wherein said center housing projections are positioned around the circumference of said inside surface of said center housing cylinder wall to engage said outer surface of said bearing housing.

6. An endshield assembly in accordance with claim 4 wherein said bearing housing comprises a first anti-rotation keyway portion, said center housing comprises a second anti-rotation keyway portion, said first and second anti-rotation keyway portions configured to align to form an anti-rotation keyway, said endshield assembly futher comprising an anti-rotation key positioned in said anti-rotation keyway.

7. An endshield assembly in accordance with claim 5 wherein said center housing comprises six projections positioned around the circumference of said inside surface of said center housing to engage said outer surface of said bearing housing.

8. An endshield assembly in accordance with claim 7 wherein a first group of three of said six projections contact said outer surface of said bearing housing from said circumferential centerline of said bearing housing to a first side edge of said bearing housing, and a second group of three of said six projections contact said outer surface of said bearing housing from said circumferential centerline to a second side edge.

9. An endshield assembly in accordance with claim 8 wherein said six projections are positioned such that each member of said first group of three projections is adjacent a member of said second group of three projections.

10. An endshield assembly in accordance with claim 1 wherein said endshield comprises a flange defining a center opening, said flange coupled to said center housing.

11. An electric motor assembly comprising:

a motor housing;

a stator mounted in said housing and comprising a bore therethrough;

a rotor core rotatably mounted in said housing and extending through said stator bore;

a rotor shaft extending through said rotor core; and at least one endshield assembly, each said endshield assembly comprising:

a metal endshield;

a bearing assembly, said bearing assembly sized to receive said rotor shaft of said electric motor; and an injected molded metal center housing that couples said bearing assembly to said metal endshield, said center housing comprising:

a cylindrical wall having an inside surface and an outside surface; and a plurality of projections extending from said inside surface, said projections positioned around a circumference of said inside surface to engage an outer surface of said bearing assembly, each said projection contacts said outer surface of said bearing housing on an opposite side of a bearing housing circumferential centerline than an immediately adjacent projection.

12. An electric motor assembly in accordance with claim 11 wherein said bearing assembly comprises a cylindrical housing having an outer surface.

13. An electric motor assembly in accordance with claim 12 wherein said center housing projections are positioned around the circumference of said inside surface of said center housing cylinder wall to engage said outer surface of said bearing housing.

14. An electric motor assembly in accordance with claim 13 wherein said center housing comprises six projections positioned around the circumference of said inside surface of said center housing, and a first group of three of said six projections contact said outer surface of said bearing housing from the circumferential centerline of said bearing housing to a first side edge of said bearing housing, and a second group of three of the six projections contact said outer surface of the bearing housing from the circumferential centerline to a second side edge of said bearing housing.

* * * * *